Figure 1:
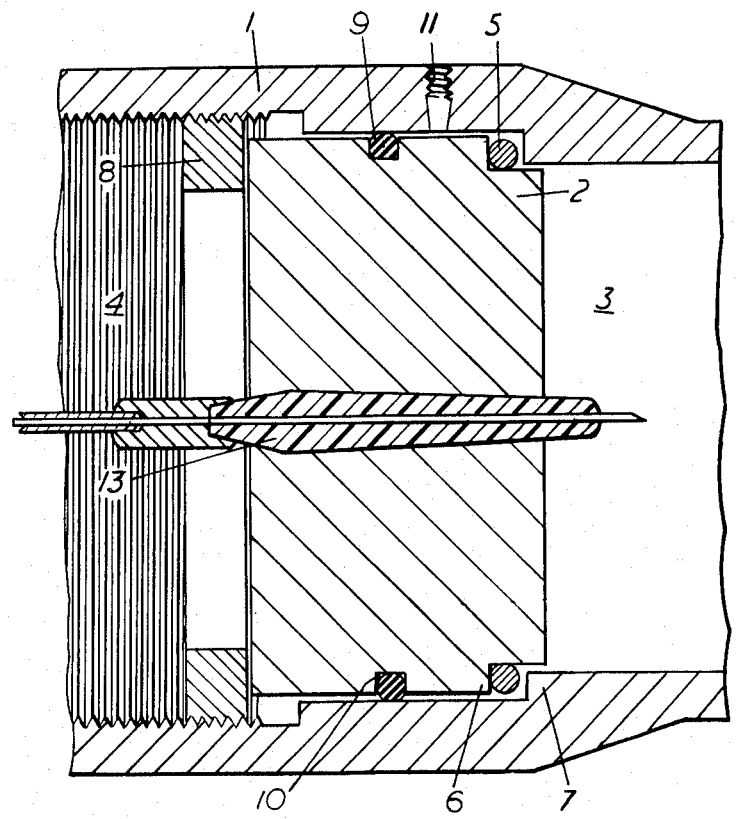

June 28, 1966  F. L. J. JARVIS  3,258,520
EQUIPMENT HOUSING HAVING FLUID INTAKE AND SEALING MEANS
Filed Sept. 6, 1963  2 Sheets-Sheet 1

Inventor
FRANK L. J. JARVIS
By *Percy P. Lantzy*
Attorney

June 28, 1966  F. L. J. JARVIS  3,258,520
EQUIPMENT HOUSING HAVING FLUID INTAKE AND SEALING MEANS
Filed Sept. 6, 1963  2 Sheets-Sheet 2

INVENTOR.
FRANK L. J. JARVIS
BY
ATTORNEY

United States Patent Office 3,258,520
Patented June 28, 1966

3,258,520
EQUIPMENT HOUSING HAVING FLUID INTAKE AND SEALING MEANS
Frank Lewis John Jarvis, London, England, assignor to International Standard Electric Corporation, New York, N.Y., a corporation of Delaware
Filed Sept. 6, 1963, Ser. No. 307,054
Claims priority, application Great Britain, Sept. 19, 1962, 35,665/62
5 Claims. (Cl. 174—18)

This invention relates to demountable watertight housings for electrical equipment and to bulkhead sealing arrangements for such equipment.

In submarine cable systems such housings are used to protect submersible amplifiers and associated equipment against hydrostatic pressure to which it is subjected in service and against ingress of moisture.

For ease of assembly demountable housings are frequently used. They generally comprise a central cylindrical chamber within the pressure resisting body of the housing and two outer chambers, one at each end of the central chamber. This latter chamber contains the electrical equipment of the system and is maintained at substantially atmospheric pressure. The outer chambers contain the fittings required for attaching the cable armouring to the housing and are maintained at full hydrostatic pressure.

After insertion of the electrical equipment into the central chamber of the housing the chamber has to be filled with an inert and dry gas and also closed by removable bulkheads provided with suitable sealing arrangements. A further seal is provided for the cable core which is taken through the bulkhead, but the present invention concerns itself only with the sealing arrangements between the bulkhead and the housing.

The known designs of demountable housings bulkheads are additionally provided with a channel connecting the central and outer chambers of the housing. This channel is used for admitting dry gas to the central chamber and is provided with suitable sealing means.

Each bulkhead is thus provided with three independent seals which are effectively in parallel with each other, the failure of any seal rendering the remaining seals useless.

In order to reduce the number of seals and thereby reduce the probability of failure there is provided a housing comprising a central chamber for mounting electrical equipment and a bulkhead closing said chamber having two seals arranged in series with each other and defining a space between the housing and the bulkhead and a channel for connecting the said space to a source of gas, the arrangement being such that the gas may be admitted through one of the seals before its closure to the central chamber of the housing.

Figure 2:
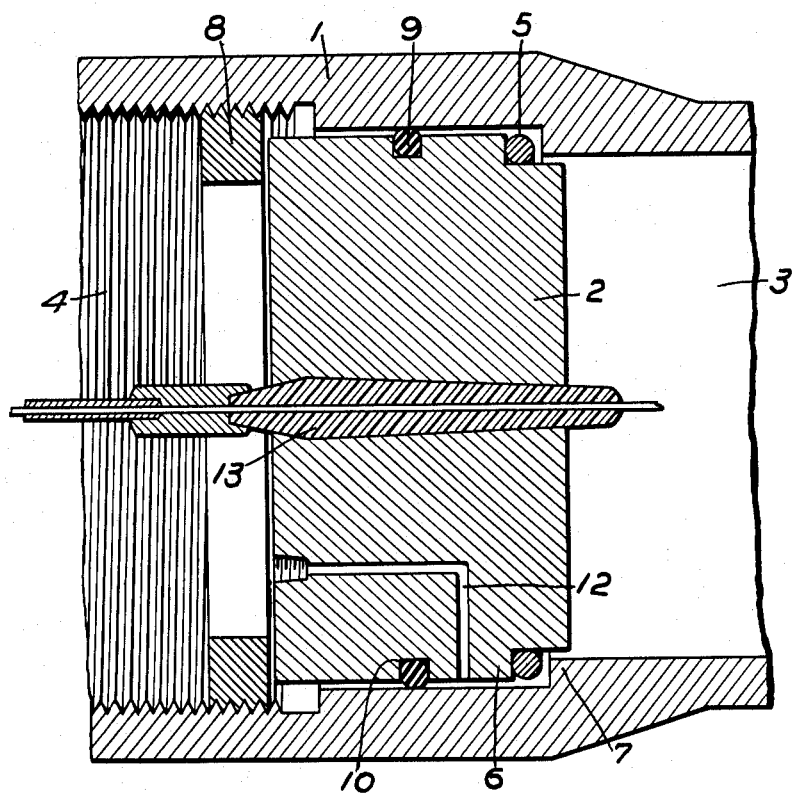

Embodiments of the invention will now be described with reference to the accompanying drawings in which:

FIG. 1 shows a first embodiment in section through a portion of the housing with one of the bulkheads in position; and FIG. 2 shows a second embodiment also in section through the housing.

In FIG. 1 the pressure housing is indicated by 1. Bulkhead 2 separates the central chamber 3 containing the equipment from one of the two outer chambers 4. An annular gasket 5 of deformable material, for instance copper or organic material is placed in the space between a shoulder 6 in the bulkhead and a shoulder 7 in the wall of the housing. When the clamping ring 8 is screwed against the bulkhead the gasket 5 is deformed by pressure between the shoulders 6 and 7 and effects a water and gas tight seal. In the drawing the gasket 5 is shown as it is before the bulkhead is pressed against the abutment by the clamping ring.

A gasket 9 of resilient material, for example high grade synthetic rubber, is inserted in a peripheral groove 10 in the outer surface of the bulkhead. When the bulkhead is inserted into the housing this gasket is elastically deformed and provides a subsidiary seal. The surface of the housing which constrains this gasket is cylindrical so that its sealing properties are not affected by axial movements of the bulkhead relative to the housing.

The central chamber 3 is filled with dry gas with the bulkhead in position but before the gasket 5 is compressed. For this purpose channel 11 is provided through the wall of the housing. Through this channel the gas is admitted into the central chamber 3, past the gasket 5 and via the annular space between the two gaskets. The purpose of gasket 9 is to prevent the escape of gas along the bulkhead in the opposite direction.

In a double ended housing a bulkhead arrangement similar to the one described is provided at each end of the housing. This enables the central chamber of the housing to be flushed with dry gas by allowing it to enter through channel 11 in one bulkhead and to escape through channel 11 of the other bulkhead.

When dry gas has filled the central chamber the clamping rings 8 of both bulkheads are tightened, sealing off the central chamber. If required channel 11 through the wall of the housing may be replaced by a channel terminating in the outer chamber 4. This alternative channel is shown in the embodiment of FIG. 2 by 12. The cable core gland is indicated schematically by 13.

It is to be understood that the foregoing description of specific examples of this invention is not to be considered as a limitation on its scope.

What I claim is:

1. A housing, comprising: a cylindrical central chamber for mounting electrical equipment; a bulkhead in the form of a cylinder positioned proximate to one end of said chamber defining an annular space between said housing and said bulkhead; a first seal arranged about and secured on said bulkhead intermediate the ends thereof and interposed within said annular space; a second seal arranged about said bulkhead between said bulkhead and said chamber at that end thereof which is proximate to said one end of said chamber; a channel connecting a source of gas with said annular space intermediate said first and second seals for supplying gas thereto and means for moving said bulkhead toward said one end of said chamber, said means pressing said bulkhead against said second seal to close said one end of said chamber.

2. A housing, according to claim 1, wherein: said one end of said chamber has a radial shoulder; said bulkhead has a radial shoulder at one end thereof for mating with said radial shoulder in said one end of said chamber; said second seal is arranged on said radial shoulder of said bulkhead; and said first seal is an annular gasket of resilient material compressed between said bulkhead and said housing.

3. A housing, according to claim 1, wherein said channel is disposed in the wall of said housing.

4. A housing, according to claim 1, wherein said channel is formed through said bulkhead.

5. A housing, according to claim 1, wherein said first seal is contained in a groove in the outer surface of said bulkhead.

References Cited by the Examiner
UNITED STATES PATENTS
2,914,599  11/1959  Clarke et al. _____ 174—70 X
3,101,953   8/1963  Bosshard _____ 277—58 X LARAMIE E. ASKIN, Primary Examiner.
JOHN F. BURNS, Examiner.